Patented Nov. 26, 1935

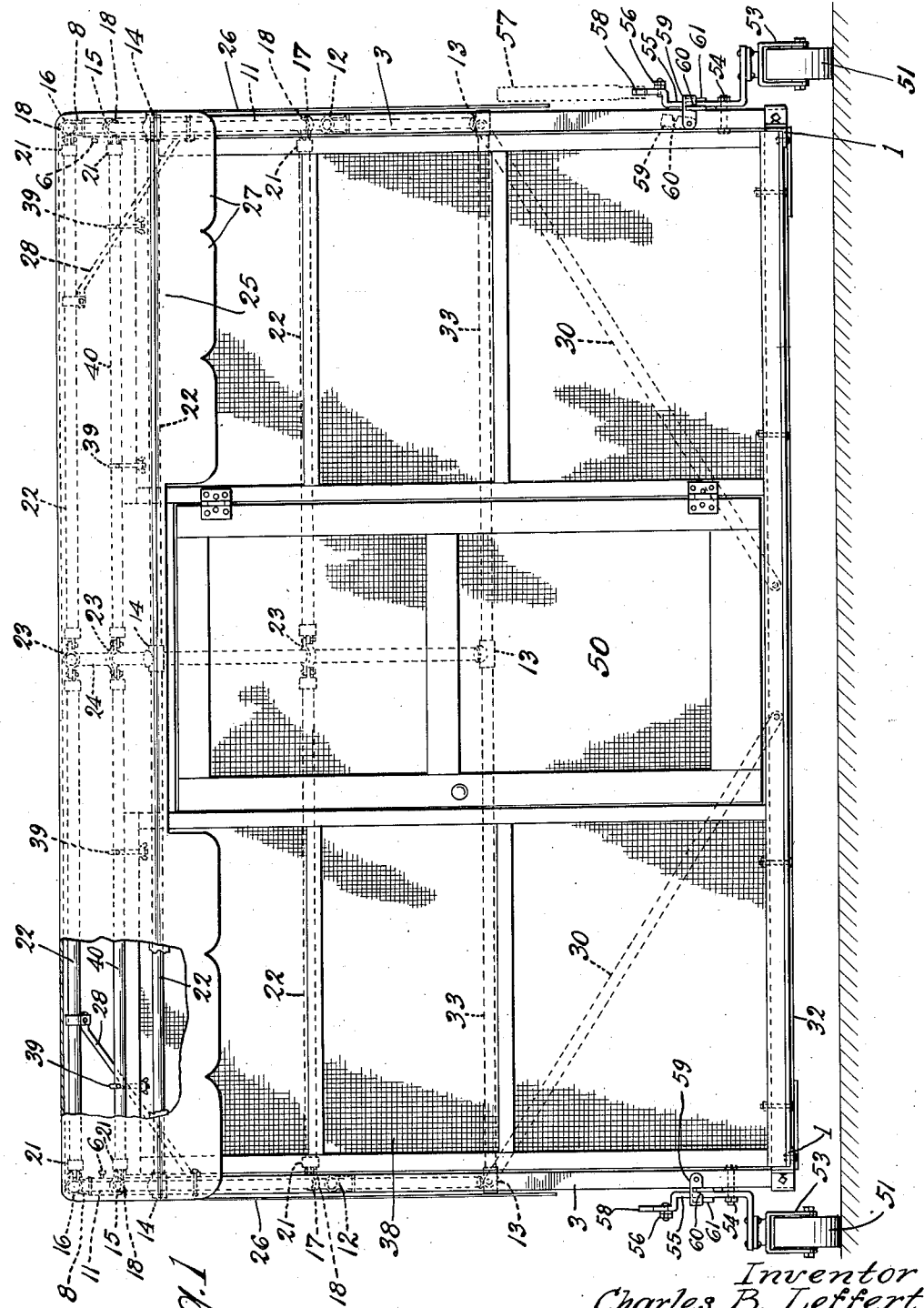

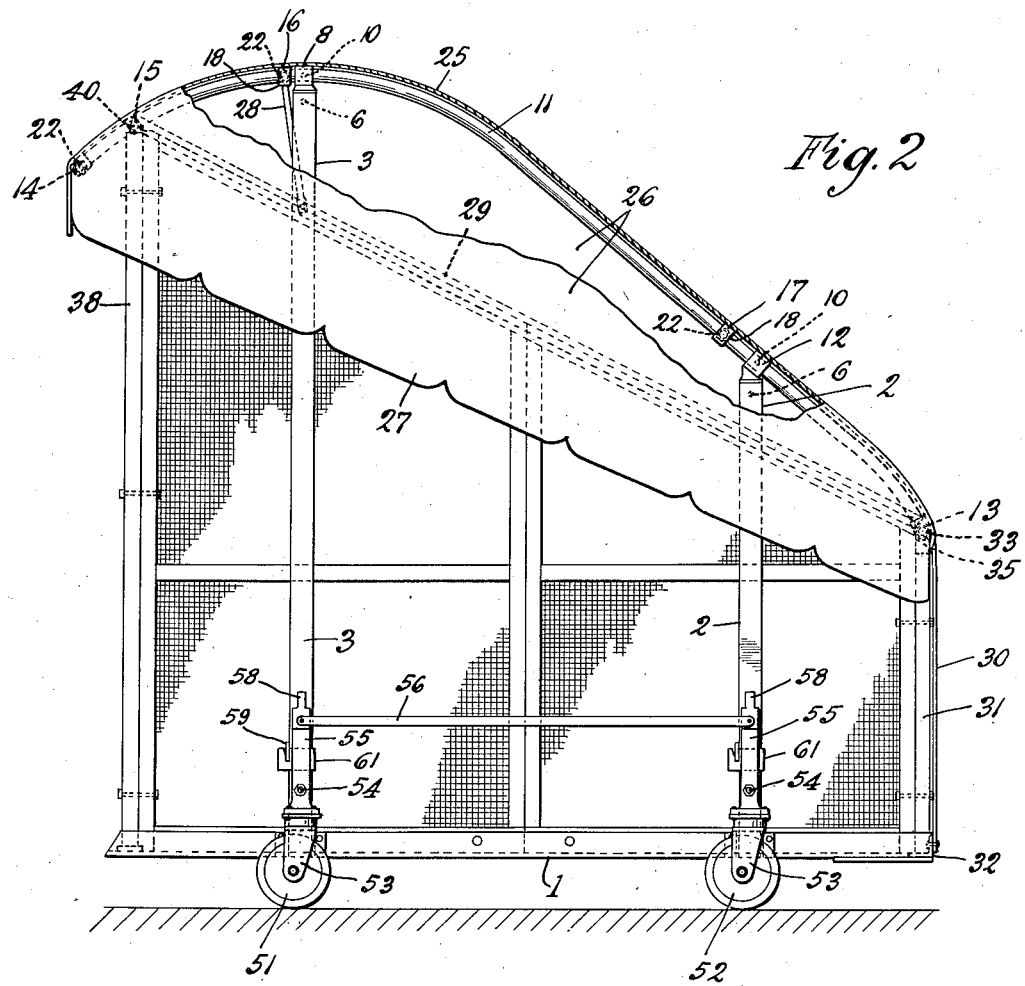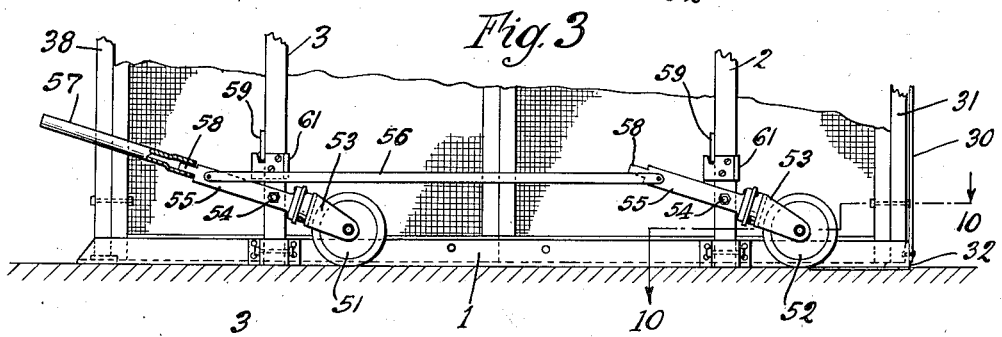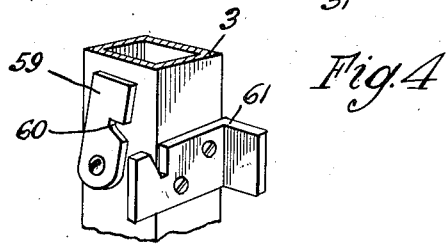

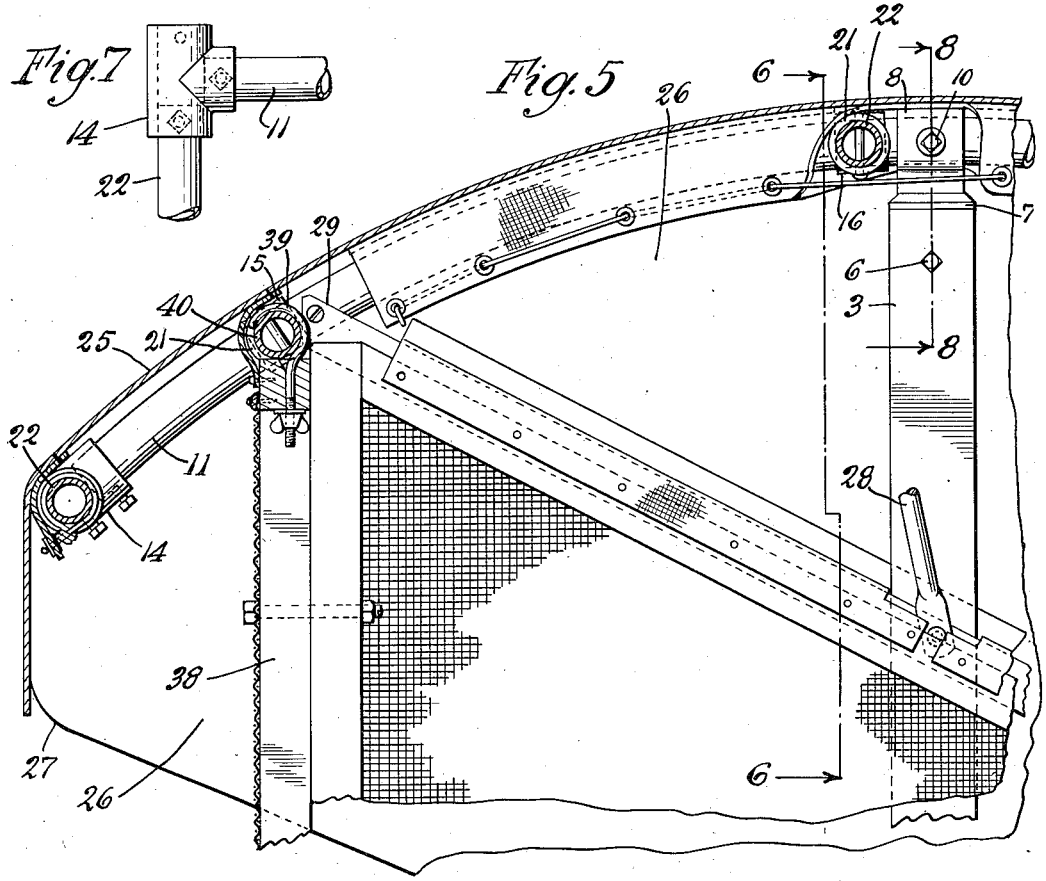
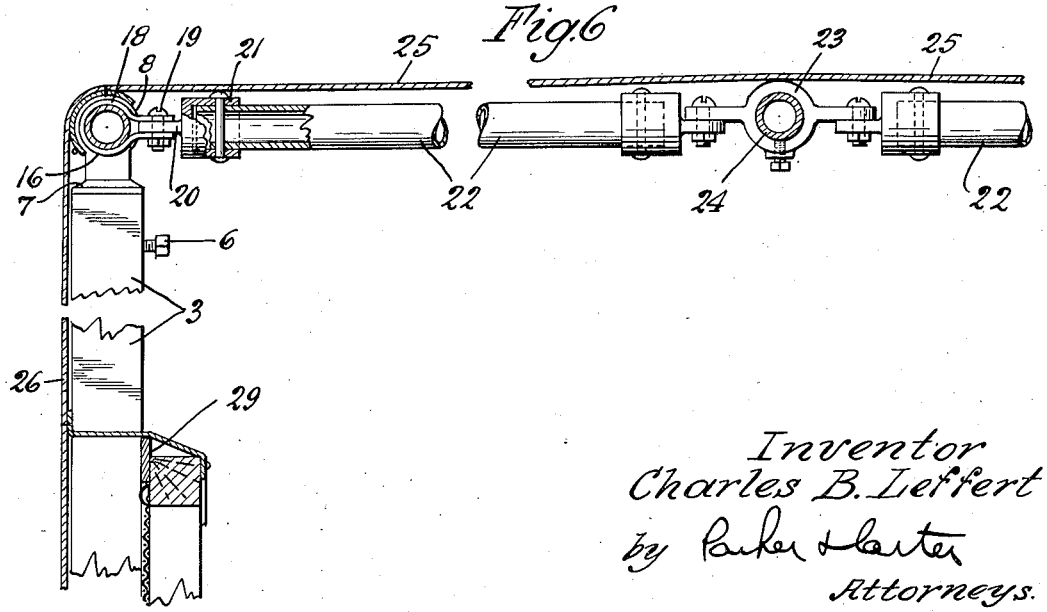

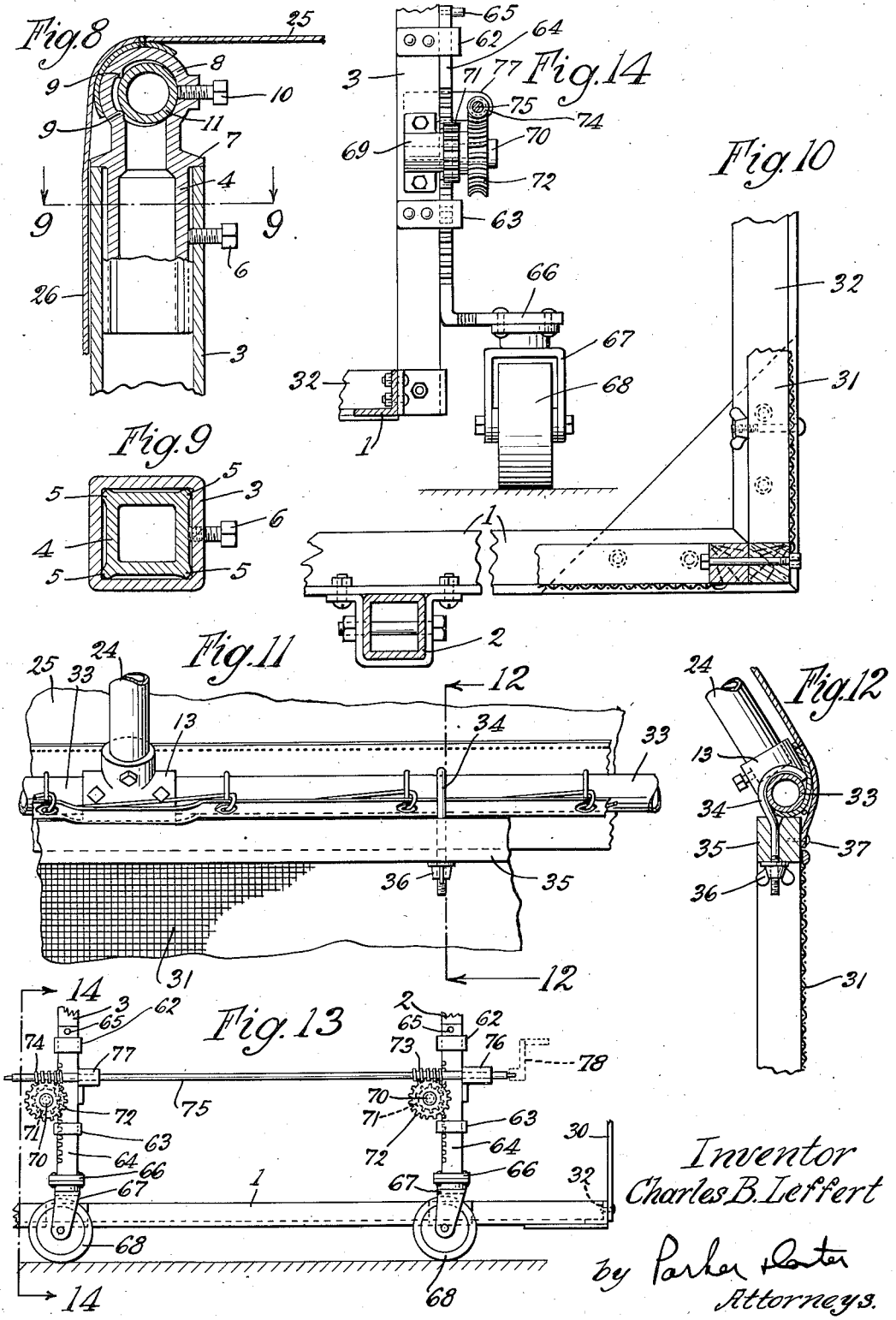

2,022,211

UNITED STATES PATENT OFFICE 2,022,211

PORTABLE LAWN CANOPY

Charles B. Leffert, Chicago, Ill., assignor to Geo. B. Carpenter & Co., Chicago, Ill., a corporation of Illinois Application May 2, 1934, Serial No. 723,445

6 Claims. (Cl. 135—7.1)

My invention relates to improvements in portable lawn canopies and has for one object to provide a new and improved form of such canopy which will be light, easily portable, give ample protection from the sun, wind, rain and the like and if desired protection against insects. Another object is to provide a canopy big enough to cover and protect a number of large pieces of lawn furniture without undue weight. Another object is to provide a suitable though portable lawn canopy. Other objects will appear from time to time throughout the specification and claims.

My invention is illustrated more or less diagrammatically in the accompanying drawings, wherein—

Figure 1 is a front elevation;

Figure 2 is an end elevation with parts in section;

Figure 3 is an end elevation of part of the device shown in Figure 2 with the supporting casters in the down position;

Figure 4 is a detail perspective of the latch which holds the casters in the up or portable position;

Figure 5 is a view similar to a part of Figure 2 on a larger scale;

Figure 6 is a section along the line 6—6 of Figure 5;

Figure 7 is a detail of one of the connecting T's which join the frame elements;

Figure 8 is a section on an enlarged scale along the line 8—8 of Figure 5;

Figure 9 is a section along the line 9—9 of Figure 8;

Figure 10 is a section on an enlarged scale along the line 10—10 of Figure 3;

Figure 11 is a view of the inside of the canopy showing the relationship between the screen, the canopy and the supporting structure;

Figure 12 is a section along the line 12—12 of Figure 11;

Figure 13 is a variant form of supporting casters for the device; and

Figure 14 is an enlarged section along the line 14—14 of Figure 13.

Like parts are indicated by like characters throughout the specification and drawings.

My portable canopy comprises a rectangular horizontally disposed frame 1. Projecting upwardly from opposed ends of this frame are tubular uprights 2, 3, preferably rectangular in cross section. The upright 3 is longer than the upright 2. Socketed in the upper open end of upright 3 is a hollow shank 4 having corner ribs 5 adapted to engage the corners of the upright 3 and adapted to be locked in position by a set screw 6. 7 is a flange projecting upwardly from the shank 4 to rest upon the upper end of the tube 3. Projecting upwardly above the flange is a hollow yoke 8 having interior projections 9 and threaded to contain a set screw 10 so that a tubular frame member 11 passed through the yoke 8 may be locked in position by the engagement of the set screw 10 by being forced against the projections 9.

The upright 2 carries a similar device to that shown in Figure 8 except that the axis of the yoke 12 is inclined to the axis of the shank instead of being perpendicular to it as shown in the device. The structural member 11 passes through both yokes 8 and 12 and is curved as indicated to define the contour of the awning. At each end of the main frame members 11 are sockets 13, 14. Spaced along each member 11 and it will be understood that there is one at each end of the structure, are a series of yokes 15, 16, 17 and these yokes as shown particularly in Figure 6 comprise straps 18 which encircle the tubular member and are clamped together thereabout by means of the bolts 19 passing through the plates 20, which plates carry the sockets 21. Each of these sockets 21 carry pivoted riveted or otherwise attached thereto a longitudinal frame member 22, there being a plurality of these longitudinal frame members joined together by similar sockets 23 intermediate their ends associated with a structural member 24 similar to the members 11. Thus a structural frame is formed supported at each end higher at the center than at either front or rear but lower at the rear than at the front. 25 is an awning or cover which is supported on the structure thus formed which at each end has side wall portions 26. The awning is surrounded by a scalloped portion 27. 28 are cross members extending between the uprights 3 and the upper or perhaps ridge member to steady the structure. 29 is a cross brace member extending from the yoke 13 across in engagement with the uprights 2 and 3 to the yoke 15 thereby giving a diagonal stiffening of the structure to the entire assembly. 30 indicates cross members extending from the yokes 13 to the lower frame member also for the purpose of stiffening the entire structure.

Screen panels are associated with the structure, there being a screen extending across the back as indicated at 31, resting on the angle 32 extending up to the structural member in line with the yoke 13. This structural member 33 is engaged by a hook 34 in the screen frame 35 and so by manipulating the thumb screw 36 the screen panel may be locked in place. The canopy may be tacked as indicated at 37 to the screen panel as desired.

A similar structure is found at the front of the canopy where the screen panels 38 are held by hooks 39 to the tube 40, there being, of course, a space between them for the door 50. At the two ends, the screen panels resting as they do upon the framework project upwardly inside the uprights 2 and 3 and terminate in juxtaposition to the inclined stiffening member 29, at which point the canopy 26 also terminates being provided with any suitable terminal means such as a button or the like by which the canopy and the screen may be fastened together.

This whole structure must, of course, be a portable one. To accomplish that, it is provided with caster rollers 51, 52 on yokes 53, which yokes are pivoted at 54 on the uprights 2 and 3 respectively. Extending upwardly from the yokes beyond the rollers are extensions 55 joined by pivot links 56. A bar 57 may be socketed on the stop 58 on the extension 55 and the operator may rotate both caster supports in a clockwise direction to lift the structure from the position shown in Figure 3 to that shown in Figure 2 and when this is done the extension 55 engages the stop 61 and may be held in place by the lock 59 which is notched at 60 to engage the stop 61 and provide a window lock.

Of course, other convenient means for raising and lowering the canopy and for making it portable might be designed and the structure I have shown is merely illustrative.

In the modified form shown in Figures 13 and 14 is illustrated a different apparatus for raising and lowering the framework. Mounted on the uprights 2 and 3 are yokes 62 and 63. Sliding in these yokes along the uprights are racks 64. Each rack has a pin 65 at its upper end adapted to engage the yoke 62 to limit the downward movement of the rack. Each rack has at its lower end a horizontal extension 66 upon which is mounted for rotation a fork 67 carrying the roller 68. 69 are bearings on the uprights 2 and 3. Rotatable in each of these bearings are shafts 70 carrying pinions 71 to mesh with the racks and work wheels 72, which wheels are meshed by worms 73, 74 on a shaft 75 which shaft is mounted in bearings 76, 77. A crank 78 may be applied to the squared end of the shaft to rotate them in unison and raise and lower the framework. The effect and manipulation of the device except for specific details of the rack, worm gear and pinion is the same as the device shown in Figures 2 and 3.

It will be understood that the mounts may be used with the awning and with the screen. It may be used without the screen. It may be moved about to suit the convenience of the user. It is heavy enough so that it will not blow over and light enough so that it can be handled. The parts from which it is made are interchangeable so a different size of mounts may be made with the same general equipment.

I claim:
1. In a canopy, a rectangular horizontal frame, two uprights one longer than the other projecting above the opposed ends thereof, tubular yokes socketed in the ends of said uprights and a curved roof frame supported and adjustably locked in position in each pair of yokes.

2. In a canopy, a rectangular horizontal frame, two uprights one longer than the other projecting above the opposed ends thereof, tubular yokes socketed in the ends of said uprights and a curved roof frame supported and adjustably locked in position in each pair of yokes, yokes slidable on said curved roof frames and transverse roof members supported on said latter yokes and extending between the frames.

3. In a canopy, a rectangular horizontal frame, two uprights one longer than the other projecting above the opposed ends thereof, tubular yokes socketed in the ends of said uprights and a curved roof frame supported and adjustably locked in position in each pair of yokes, yokes slidable on said curved roof frames and transverse roof members supported on said latter yokes and extending between the frames, an intermediate curved roof frame member conforming in shape with those supported on the uprights and supported on the transverse members.

4. In a canopy, a rectangular horizontal frame, two uprights one longer than the other projecting above the opposed ends thereof, tubular yokes socketed in the ends of said uprights and a curved roof frame supported and adjustably locked in position in each pair of yokes, yokes slidable on said curved roof frames and transverse roof members supported on said latter yokes and extending between the frames, an intermediate curved roof frame member conforming in shape with those supported on the uprights and supported on the transverse members, the support of the intermediate roof frame member including yokes slidable thereon, sockets carried by said last named yokes into which opposed ends of the transverse members are socketed.

5. In a canopy, a rectangular horizontal ground contacting frame, two uprights projecting therefrom at each end thereof, a roof frame structure supported on said uprights, caster wheels supported on said uprights and means for moving said wheels on an arc to raise and lower the frame, said roof frame adapted to support a canopy extending downwardly thereabout and the horizontal frame adapted to support screens extending upwardly to join the canopy.

6. In a canopy, a rectangular horizontal ground contacting frame, two uprights projecting therefrom at each end thereof, a roof frame structure supported on said uprights, caster wheels supported on said uprights and means for moving said wheels on an arc to raise and lower the frame, said roof frame adapted to support a canopy extending downwardly thereabout and the horizontal frame adapted to support screens extending upwardly to join the canopy, there being hooks adapted to encircle parts of the roof frame and to clamp the screens thereto.

CHARLES B. LEFFERT.